United States Patent
de Reynal, Jr.

(10) Patent No.: US 9,556,728 B2
(45) Date of Patent: Jan. 31, 2017

(54) METHODS AND SYSTEMS OF ANALYZING WELLBORE DRILLING OPERATIONS

(71) Applicant: Varel Europe S.A.S., Pau (FR)

(72) Inventor: Michel de Reynal, Jr., Arthez de Bearn (FR)

(73) Assignee: VAREL EUROPE S.A.S., Pau (FR)

( * ) Notice: Subject to any disclaimer, the term of this patent is extended or adjusted under 35 U.S.C. 154(b) by 453 days.

(21) Appl. No.: 14/153,957

(22) Filed: Jan. 13, 2014

(65) Prior Publication Data

US 2015/0198035 A1  Jul. 16, 2015

(51) Int. Cl.

| | |
|---|---|
| E21B 49/00 | (2006.01) |
| G01V 99/00 | (2009.01) |
| G01V 5/12 | (2006.01) |
| G01V 1/34 | (2006.01) |
| G01V 1/40 | (2006.01) |
| E21B 44/00 | (2006.01) |
| G01V 1/50 | (2006.01) |
| G01V 11/00 | (2006.01) |

(52) U.S. Cl.
CPC ............. *E21B 49/003* (2013.01); *E21B 44/00* (2013.01); *G01V 1/345* (2013.01); *G01V 1/50* (2013.01); *G01V 5/12* (2013.01); *G01V 11/00* (2013.01); *G01V 99/00* (2013.01); *G01V 1/40* (2013.01); *G01V 2210/624* (2013.01)

(58) Field of Classification Search
CPC ......... E21B 49/003; G01V 11/00; G01V 1/50; G01V 1/345; G01V 5/12
See application file for complete search history.

(56) References Cited

U.S. PATENT DOCUMENTS

| | | |
|---|---|---|
| 4,914,591 A | 4/1990 | Warren et al. |
| 5,767,399 A | 6/1998 | Smith et al. |
| 6,044,327 A | 3/2000 | Goldman |
| 6,349,595 B1 | 2/2002 | Civolani et al. |
| 6,386,297 B1 * | 5/2002 | Cooley .................. E21B 44/00 175/39 |
| 6,424,919 B1 * | 7/2002 | Moran ................... E21B 44/00 702/6 |
| 6,612,382 B2 | 9/2003 | King |
| 7,085,696 B2 | 8/2006 | King |
| 7,261,167 B2 | 8/2007 | Goldman et al. |
| 7,357,196 B2 | 4/2008 | Goldman et al. |
| 7,775,297 B2 | 8/2010 | Hopwood et al. |
| 8,082,104 B2 | 12/2011 | de Reynal |

(Continued)

OTHER PUBLICATIONS

Nygaard, Geomechanical Analysis, 2010, pp. 1-4.*

(Continued)

*Primary Examiner* — John Breene
*Assistant Examiner* — Mohammad Islam

(57) ABSTRACT

A method for analyzing a wellbore drilling operation includes acquiring sonic log data, gamma ray log data, and rate of penetration (ROP) data. The sonic log data, the gamma ray log data, and the ROP data are associated with depth intervals of a wellbore. The method further includes determining unconfined compressive strength (UCS) of a rock formation associated with the wellbore using well log data and drilling data. The well log data is limited to the sonic log data and the gamma ray log data, and the drilling data is limited to the ROP data.

13 Claims, 10 Drawing Sheets

(56) References Cited

U.S. PATENT DOCUMENTS

| | | | | |
|---|---|---|---|---|
| 2003/0015351 A1* | 1/2003 | Goldman | ............... | E21B 12/02 |
| | | | | 175/39 |
| 2005/0267719 A1 | 12/2005 | Foucault | | |
| 2005/0284661 A1* | 12/2005 | Goldman | ............... | E21B 12/02 |
| | | | | 175/39 |
| 2009/0254283 A1* | 10/2009 | Jacobi | ................... | G01V 11/00 |
| | | | | 702/11 |
| 2010/0191471 A1* | 7/2010 | de Reynal | ............. | E21B 49/003 |
| | | | | 702/9 |
| 2013/0179081 A1* | 7/2013 | Bartetzko | ............. | G01V 11/00 |
| | | | | 702/8 |
| 2014/0318866 A1* | 10/2014 | Lewis | ................... | E21B 10/00 |
| | | | | 175/40 |

OTHER PUBLICATIONS

Motahhari, Method of Optimizing Motor and Bit Performance for Maximum ROP, 2007.*

Extended European Search Report dated Mar. 24, 2016 for application No. 15150954.4.

R. Nygaard et al., Eight Years Experience With a Drilling Optimization Simulator in the North Sea, IADC/SPE77247, 2002, pp. 1-8, IADC/SPE Asia Pacific Drilling Technology.

Labas et al., Assessment of Abrasiveness for Research of Rock Cutting, No. 1, 65-73, 2012, pp. 65-73, Acta Montanistica Slovaca.

G. Gjelstad et al., The Method of Reducing Drilling Costs More Than 50 percent, SPE 47342, 1998, pp. 1-7, Society of Petroleum Engineers, Inc.

R.K. Bratli et al., Drilling Optimization Software Verified in the North Sea, SPE 39007, Aug. 30-Sep. 2, 1997, pp. 1-7, Society of Petroleum Engineers, Inc.

* cited by examiner

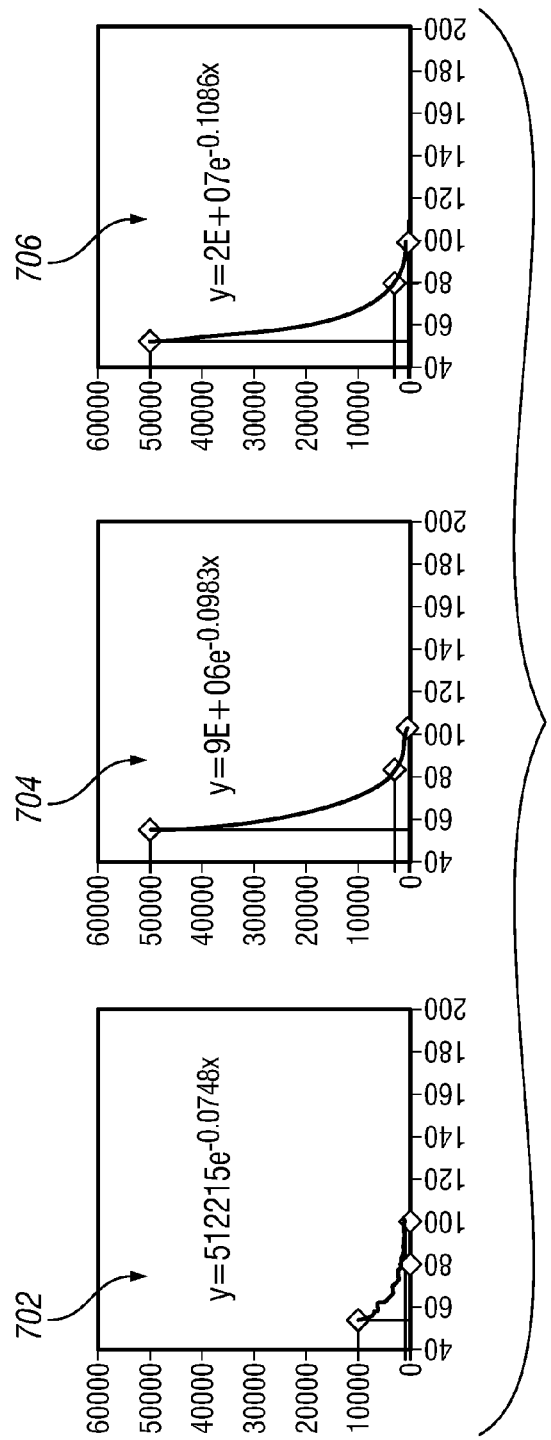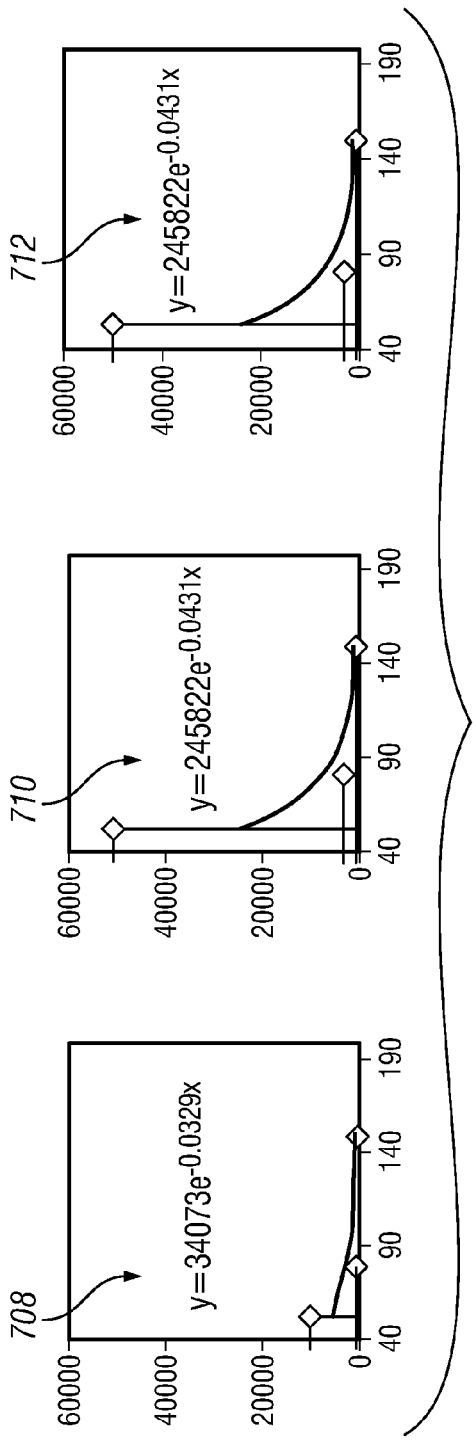
FIG. 7A
FIG. 7B

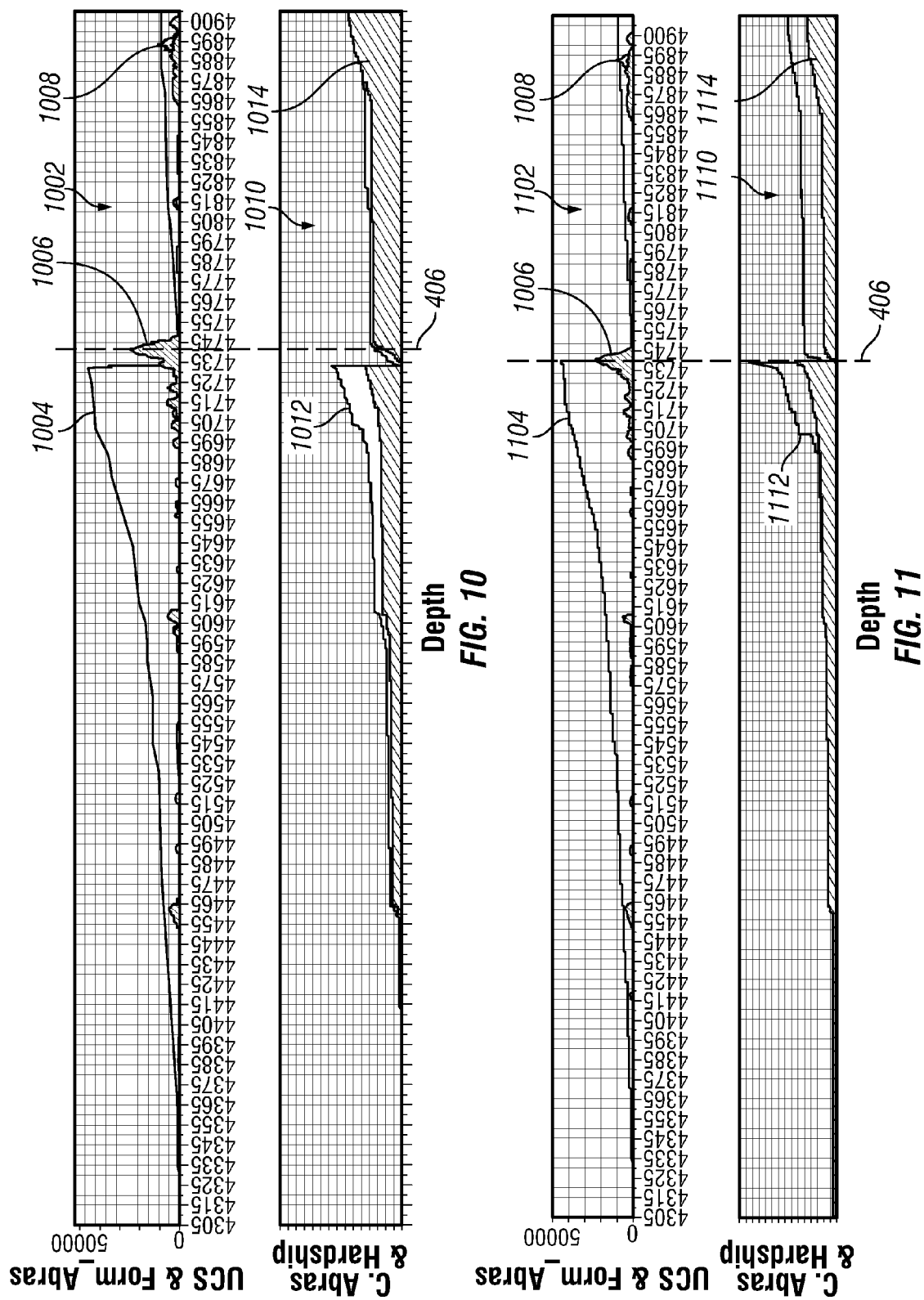

METHODS AND SYSTEMS OF ANALYZING WELLBORE DRILLING OPERATIONS

TECHNICAL FIELD

The present disclosure relates generally to analyzing wellbore drilling operations, and more particularly, to methods and systems of analyzing wellbore drilling operations based on limited well log data.

BACKGROUND

In oil and gas well drilling operations, multiple wells may be drilled in a single field. Because a particular field may have reasonably similar rock formations at other locations of the field, information and knowledge acquired from the drilling of one wellbore in the field may be used to improve drilling operations of subsequent wellbores in the same field. Some of the information and knowledge that could be used in subsequent wellbore drillings can be acquired through analysis of one or more already drilled wellbores. Improvements in drilling operations of subsequent wellbores may result in significant economic benefit, for example, by extending longevity of drilling tools (e.g., drill bits) and by reducing the amount of time that would otherwise take to drill the wellbores.

To illustrate, information about a rock formation associated with an already drilled wellbore may be useful in properly selecting drilling parameters, such as weight-on-bit (WOB) and bit rotational speed (RPM), in drilling subsequent wellbores in the same field as the already drilled wellbore. Further, information and knowledge acquired during the drilling of a wellbore may be used in selecting appropriate drill bits for drilling subsequent wells in the same filed. The selections of appropriate WOB, RPM and drilling bit(s) are significant factors in optimizing drilling operations and reducing drilling costs.

Some existing methods of analyzing drilling operations rely on well logs and/or drilling data associated with one or more already drilled wellbores to improve drilling programs for drilling subsequent wellbores. For example, the method described in U.S. Pat. No. 4,914,591 relies on WOB, RPM, rate of penetration (ROP), drilling fluid related parameters as well as a numerical model of a drill bit to determine the compressive strength of a rock formation. As well known to those of ordinary skill in the art, compressive strength (e.g., unconfined compressive strength (UCS)) of a rock formation is highly valuable information in the efficient drilling of wellbores. For example, the type of drill bit, WOB, and RPM selections for drilling wellbores can be appropriately selected based on UCS information acquired from one or more previously drilled wellbores.

In some methods of analyzing drilling operations, UCS and related information are determined based on a sonic log, a gamma ray log, and at least one other well log, such as a neutron density log. While sonic logs and gamma ray logs are commonly available following a drilling of a wellbore, neutron density logs and other well logs are often unavailable, or when available, they are available for a small segment of a wellbore that is inadequate to enable a satisfactory analysis of a drilling operation. Further, many methods of analyzing drilling operations often require determining porosity of a rock formation to be able to determine the UCS of the rock formation. However, because porosity may not correlate with UCS for all rock types, additional steps may be required to perform a satisfactory analysis of the drilling operation.

Accordingly, having the capability to analyze a drilling operation based on commonly available well log data and without the need for infrequently available log data is desirable. For example, methods and systems of determining UCS and other wellbore information (e.g., abrasiveness of a rock formation and total work done by a bit) based on a sonic log and a gamma ray log and without the need for a neutron density log can be highly beneficial in cost effectively analyzing drilling operations and in optimizing subsequent drilling operations.

BRIEF DESCRIPTION OF THE DRAWINGS

The foregoing and other features and aspects of the invention will be best understood with reference to the following description of certain exemplary embodiments of the invention, when read in conjunction with the accompanying drawings, wherein:

FIGS. 7A and 7B are graphs illustrating plots of equations used in determining unconfined compressive strength (UCS) of individual rock components in accordance with an exemplary embodiment;

FIG. 10 illustrates example graphs of formation abrasiveness and total work done by a drill bit based on the mathematically averaged ROP data prior to depth adjustment in accordance with an exemplary embodiment;

FIG. 11 illustrates example graphs of formation abrasiveness and total work done by the drill bit based on the mathematically averaged ROP data after depth adjustment of the mathematically averaged ROP data in accordance with an exemplary embodiment.

Figure 1:
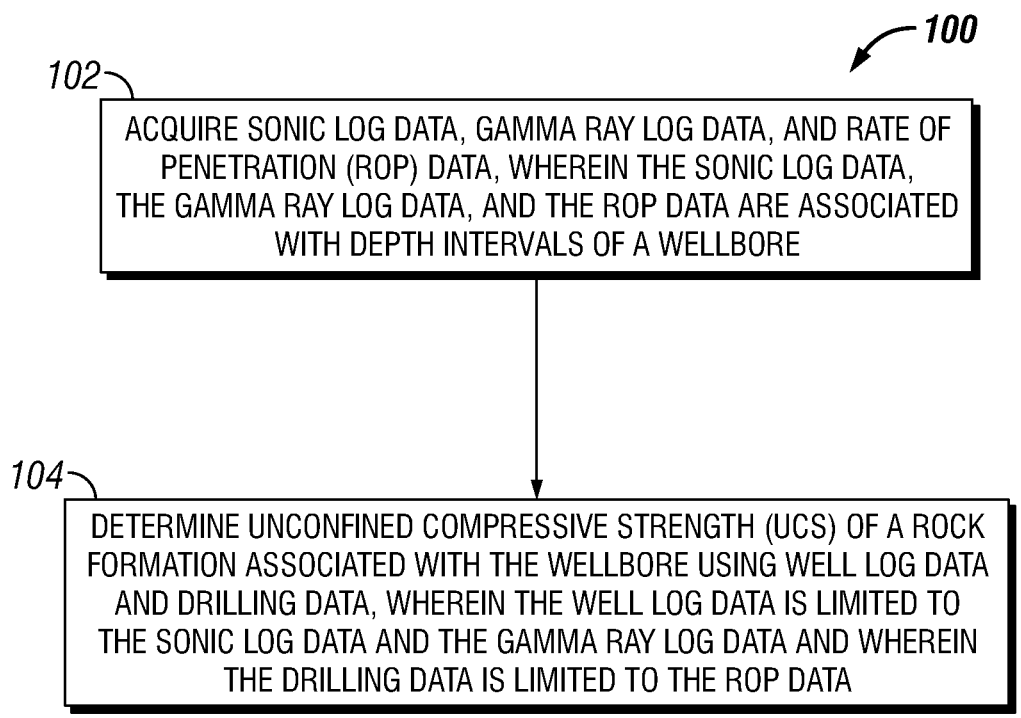
FIG. 1 is a flowchart illustrating a method of analyzing a wellbore drilling operation in accordance with an exemplary embodiment.

The drawings illustrate only exemplary embodiments of the invention and are therefore not to be considered limiting of its scope, as the invention may admit to other equally effective embodiments.

DETAILED DESCRIPTION OF THE INVENTION

The present disclosure relates generally to analyzing wellbore drilling operations. In particular, this disclosure relates to methods and systems of analyzing wellbore drilling operations based on limited well log data (i.e., sonic log data and gamma ray log data) and rate of penetration (ROP) data.

The present invention is better understood by reading the following description of non-limiting, exemplary embodiments with reference to the attached drawings, wherein like parts of each of the figures are identified by like reference characters. According to an exemplary embodiment, a method for analyzing a wellbore drilling operation includes acquiring sonic log data, gamma ray log data, and rate of penetration (ROP) data. The sonic log data, the gamma ray log data, and the ROP data are associated with depth intervals of a wellbore. The method further includes determining unconfined compressive strength (UCS) of a rock formation associated with the wellbore using well log data and drilling data. The well log data is limited to the sonic log data and the gamma ray log data, and the drilling data is limited to the ROP data.

According to another exemplary embodiment, a computer system for analyzing a wellbore drilling operation includes a module for acquiring sonic log data, gamma ray log data, and rate of penetration (ROP) data. The sonic log data, the gamma ray log data, and the ROP data are associated with depth intervals of a wellbore. The computer system further includes a module for determining UCS of a rock formation associated with the wellbore using well log data and drilling data. The well log data is limited to the sonic log data and the gamma ray log data, and the drilling data is limited to the ROP data. The computer system also includes a display device for displaying graphical representations of data, the data including the sonic log data and the gamma ray log data.

According to another exemplary embodiment, a computer-implemented method for analyzing a wellbore drilling operation includes generating, by a processor, graphical representations of sonic log data, gamma ray log data, rate of penetration (ROP) data, and a lithology of a rock formation. The sonic log data, the gamma ray log data, the ROP data, and the lithology of the rock formation are associated with depth intervals of a wellbore. The computer-implemented method further includes generating, by the processor, a graphical representation of unconfined compressive strength (UCS) data of the rock formation. The UCS data is determined by the processor based on well log data and the ROP data. The well log data is limited to the sonic log data and the gamma ray log data. The computer-implemented method also includes displaying on a display device the graphical representations of the sonic log data, the gamma ray log data, the lithology of the rock formation, the ROP data, and the UCS data of the rock formation with respect to the depth intervals of the wellbore.

According to another exemplary embodiment, a method for analyzing a wellbore drilling operation includes acquiring sonic log data, gamma ray log data, and rate of penetration (ROP) data. The sonic log data, the gamma ray log data, and the ROP data are associated with depth intervals of a wellbore. The method further includes determining a lithology of a rock formation of the wellbore using well log data and drilling data. The well log data is limited to the sonic log data and the gamma ray log data, and the drilling data is limited to the ROP data.

By determining the UCS of the rock formation and other information (such as abrasiveness and total work done by a drill bit) based on commonly available limited set of well log and drilling data, optimization of drilling programs (e.g., appropriate selection of WOB, RPM, and drill bit type) that reduce drilling costs may be performed often.

FIG. 1 is a flowchart illustrating a method 100 of analyzing a wellbore drilling operation in accordance with an exemplary embodiment. The method 100 includes acquiring sonic log data, gamma ray log data, and ROP data at step 102. The sonic log data, the gamma ray log data, and the ROP data are associated with depth intervals of a wellbore. For example, the wellbore may be an oil field wellbore or a gas filed wellbore.

As well known to those of ordinary skill in the art, the sonic log data and the gamma ray log data are well log data that are collected using wireline logging tools that are generally operated after the wellbore is drilled. To illustrate, sonic log data (generally given in units of time per distance), which indicates the capacity of a rock formation to transmit seismic waves, can be collected for different depth intervals of the wellbore using a transmitter and a receiver(s). Similarly, gamma ray log data (generally given in API units) is collected by placing a gamma ray measurement tool in the wellbore and by recording gamma radiation levels with respect to different depths of the wellbore.

Figure 4:
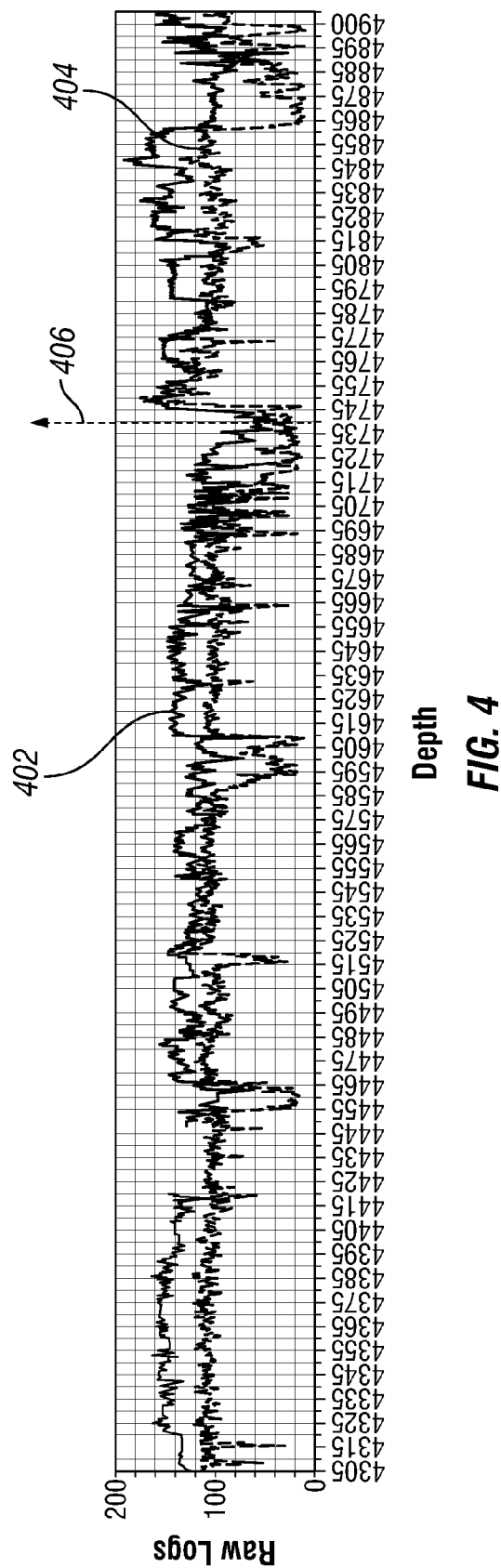
FIG. 4 is an example graph illustrating wellbore sonic log data and gamma ray log data associated with depth intervals of a wellbore.

The sonic log data and the gamma ray log data may be collected at fixed depth intervals. For example, the sonic log data and the gamma ray log data may be collected at every half foot depth of the wellbore and recorded in association with corresponding depths in the wellbore. To illustrate with an example depth of the wellbore, the sonic log data and the gamma ray log data may be recorded in association with a wellbore depth of 1001 ft. for the depth interval between 1000.5 ft. and 1001 ft. Example sonic log data curve 402 and gamma ray log data curve 404 that are associated with depths of the wellbore are illustrated in FIG. 4.

Also well known to those of ordinary skill in the art is that the ROP data is collected during the drilling of the wellbore. ROP is often described in distance per time to illustrate the depth advanced per time period. Similar to the collection and recording of the sonic log data and the gamma ray log data, the ROP data may be collected and recorded along with corresponding depths. For example, the ROP data may be collected at every half foot depth of the wellbore. As an illustrative example, the ROP data may be collected for the depth interval between 1000 ft. and 1000.5 ft., and recorded in association with a wellbore depth of 1000.5 ft. As another illustrative example, the ROP data may be collected for the depth interval between 1000.5 ft. and 1001 ft., and recorded in association with a wellbore depth of 1001 ft. The ROP data collected during drilling is considered as instantaneous ROP data.

The method 100 further includes determining UCS of a rock formation associated with the wellbore using well log data and drilling data at step 104. The well log data is limited to the sonic log data and the gamma ray log data acquired in step 102, and the drilling data is limited to the ROP data also acquired in step 102. For each depth interval of the wellbore, the UCS of the rock formation is determined based on the lithology of the rock formation at the particular depth interval and based on individual per rock type UCS equations corresponding to each rock type at the particular depth interval.

In general, the term "lithology" of a rock formation relates to one or more characteristics of the rock formation. For example, the lithology of the rock formation at each particular depth interval of the wellbore may include percentages of different rocks (for example, percentage in volume) at the particular depth interval. In some exemplary embodiments, the lithology of the rock formation at a particular depth interval of the wellbore may be based on a single rock. For example, the lithology of the rock formation at a particular depth interval of the wellbore may be such that a particular rock occupies substantially the entire depth interval. Alternatively, the lithology of the rock formation at a particular depth interval of the wellbore may be based on multiple rocks. For example, a particular depth interval of the wellbore may be occupied partially by a one rock and partially by another rock.

In some exemplary embodiments, the lithology of the rock formation at a particular depth interval may be based on just one of a first rock, a second rock, or a third rock. Alternatively, the lithology of the rock formation at a particular depth interval of the wellbore may be based on a first rock, and one of a second rock or a third rock. For example, the first rock may be a rock that emits gamma ray in amounts proportional to the percentage (for example, in volume) of the rock at a particular depth interval. To illustrate, the amount of gamma ray emitted by the first rock may have a linear, an exponential, a logarithmic, or an s-curve relationship with the volume percentage of the particular depth interval occupied by the rock. For example, the first rock may be one of shale (i.e., clay), potassium salt, granite, or a radioactive volcanic rock within a non-radioactive rock.

In some exemplary embodiments, the second rock may be a rock from one of two general categories of rocks. To illustrate, the two categories of rocks may be special mineral rocks and main rocks. Special mineral rocks may include several rocks that each has a relatively narrow range of sonic transit time. For example, anhydrite, gypsum, coal, salt, or igneous may be considered as special mineral rocks. In contrast, the main rocks may include several rocks that have a relatively wider range of sonic transit time than the special mineral rocks. To illustrate, a main rock may be one of quartz bearing rocks that are lighter than the first rock and the third rock at equivalent strength but that are harder and more abrasive than the first rock and the third rock at equivalent sonic transit time values. As an example, a main rock may be sandstone. Alternatively, a main rock may be salt or another similar rock.

In some exemplary embodiments, the third rock (also referred to as stringers) may be a single rock that is different from the first rock and the second rock. For example, the third rock may be one of limestone, dolomite, or another carbonate or similar rock. Alternatively, the third rock may be a combination of different rocks instead of just a single rock. For example, the third rock may be a combination of two or more rocks that have substantially similar relationships between their respective sonic transit time and their respective UCS. In some exemplary embodiments, the third rock may be a carbonate in a clayey salt or a harder rock than, for example, the main rock.

Figure 5:
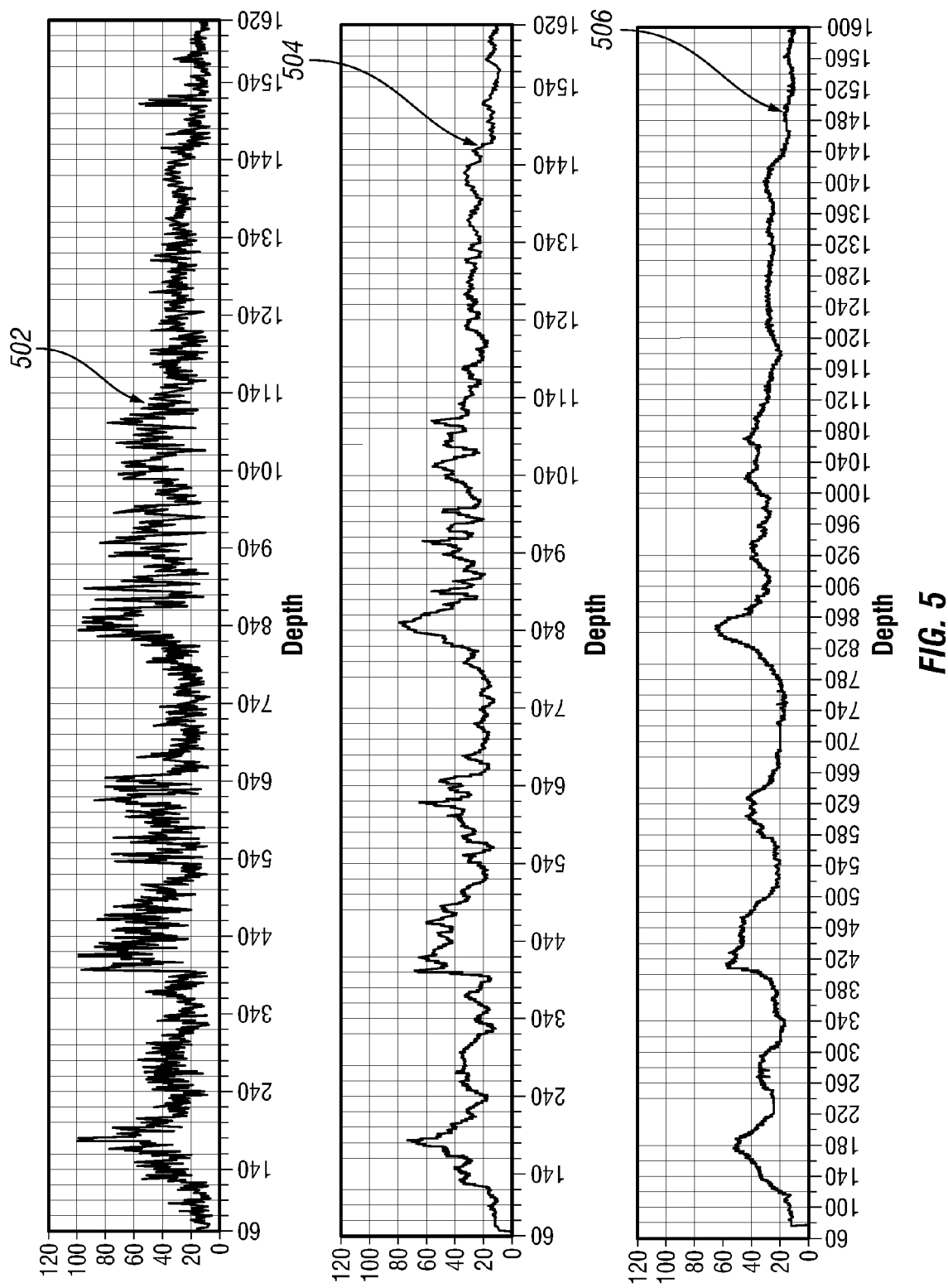
FIG. 5 illustrates example graphs of instantaneous rate of penetration (ROP) data and mathematically averaged ROP data associated with depth intervals of a wellbore.

In some exemplary embodiments, the lithology of the rock formation for each depth interval of the wellbore may be determined based on the sonic log data, the gamma ray log data, an upper gamma ray threshold, a lower gamma ray threshold, and one or more sonic data thresholds. Each of the upper gamma ray threshold, the lower gamma ray threshold, and the one or more sonic data thresholds may be selected and/or adjusted based on mathematically averaged ROP data such that the lithology of the rock formation reasonably correlates with the mathematically averaged ROP data. The mathematically averaged ROP data is generated based on the ROP data acquired in step 102 of the method 100 as further described below with respect to FIG. 2. Examples of mathematically averaged ROP data curves are illustrated in FIG. 5.

Figure 6:
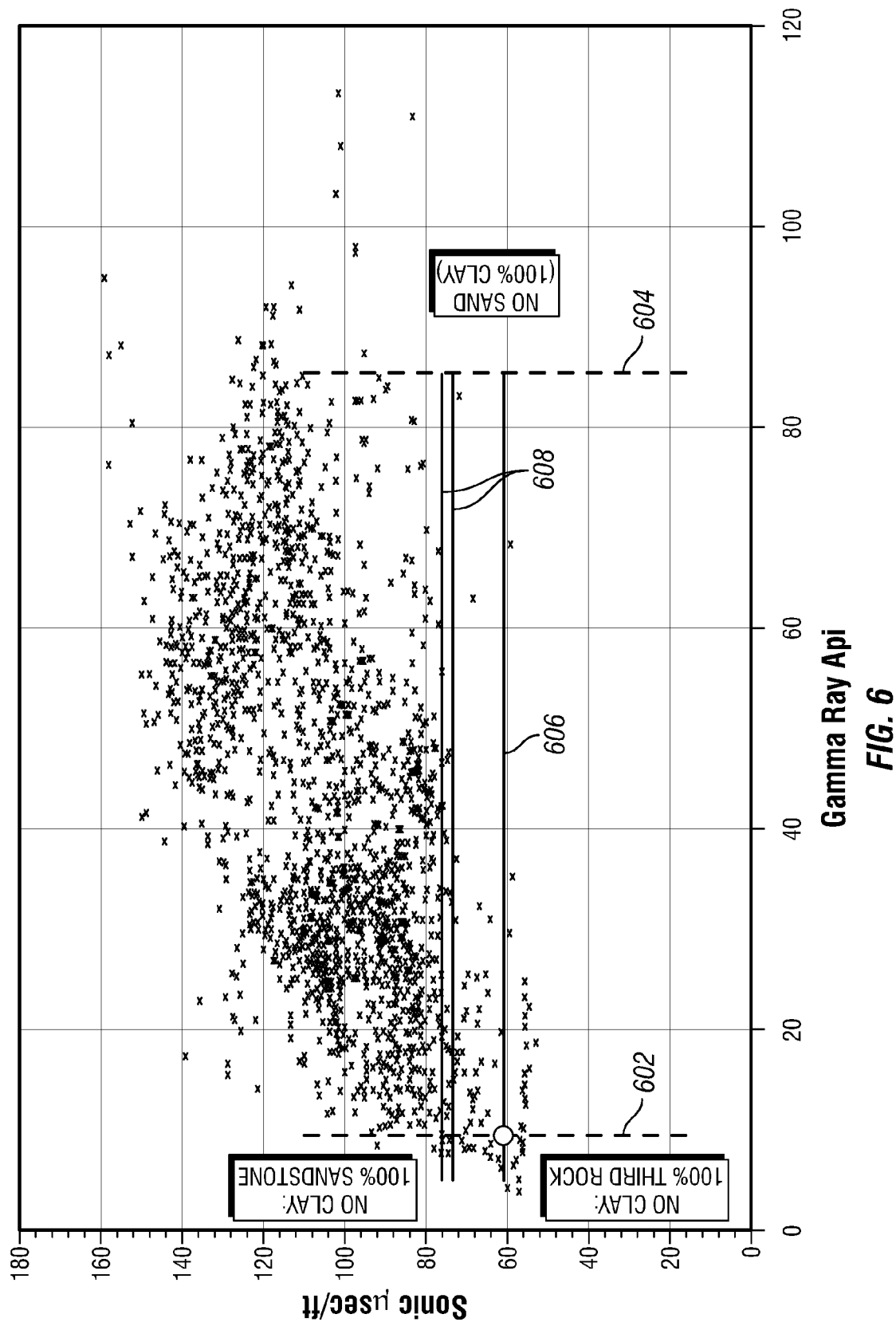
FIG. 6 is an example graph illustrating a cross-plot of wellbore sonic log data and gamma ray log data used in determining a lithology of a rock formation in accordance with an exemplary embodiment.

As described above, the lithology of the rock formation is used for the purpose of determining the UCS of the rock formation at step 104 of the method 100. To illustrate how the lithology of the rock formation may be determined, reference is made to FIG. 6, which illustrates across-plot of wellbore sonic log data and gamma ray log data. As illustrated in FIG. 6, a lower gamma ray threshold 602 and an upper gamma ray threshold 604 are shown with respect to gamma ray values provided on the horizontal axis. For example, the lower gamma ray threshold 602, the upper gamma ray threshold 604, and either a sonic data threshold 606 or a pair of sonic data thresholds 608 may be used to determine percentages of the different rocks for a particular depth interval of the wellbore. For example, the volume percentage of a particular depth interval occupied by the first rock may be determined based on the lower gamma ray threshold 602 and the upper gamma ray threshold 604.

To illustrate using clay as an example of the first rock, the percentage of clay at a particular depth interval (i.e., the percentage of the particular depth interval occupied by clay) may be determined prior to determining the percentage of the particular depth interval occupied by the second rock (e.g., a main rock such as sandstone or a special mineral rock such as anhydrite) and the percentage of the particular depth interval occupied by the third rock. As described above, the second rock may be a main rock such as sandstone or a special mineral rock such as anhydrite. Similarly, as a non-limiting example, the third rock, which may generally be referred to as stringers, may be limestone or dolomite.

To illustrate with respect to FIG. 6 and using clay as an example of the first rock, depths intervals that have gamma ray values that equal or exceed the upper gamma ray threshold 604 are considered to be 100% occupied by clay regardless of the sonic data threshold 606 or the pair of sonic data thresholds 608. Similarly, depths intervals that have gamma ray values that are equal to or less than the lower gamma ray threshold 602 are considered to be 0% clay. For each depth interval of the wellbore, the percentage of the first rock (e.g., clay) between 0% and 100% is determined according to the following equation:

$$\text{first rock \%} = (GR - GRmini)/(GRmaxi - GRmini) \quad (1)$$

where:
first rock % is the percentage of the first rock (e.g., clay) at the particular depth interval;
GR is the gamma radiation value of the gamma ray log data for the particular depth interval;
GRmini is the lower gamma ray threshold 602; and
GRmaxi is the upper gamma ray threshold 604.

Again using clay as an example of the first rock described above, after the percentages of clay are determined for the depth intervals of the wellbore based on the gamma ray log data, the percentages of clay may optionally be adjusted for all depth intervals based on information from mud logs or cutting descriptions. For example, the percentages of clay may be globally adjusted such that the relationship between the clay percentages and gamma radiation for the wellbore is linear, exponential, logarithmic, or an "s" function.

In some exemplary embodiments, after the percentage of the first rock (e.g. clay) is determined for the depth intervals of the wellbore and optionally adjusted globally as described above, the percentage of the second rock and/or the third rock for each depth interval may be determined. For example, for a particular depth internal, the percentage of the depth interval that is not occupied by the first rock may be determined as being entirely occupied by either a special mineral rock, a main rock, or the third rock. To illustrate, if 60% of a depth interval is determined as being occupied by clay using equation (1) above, the remaining 40% of the particular depth interval may be considered as being occupied by either a special mineral rock, a main rock, or the third rock as described below.

As described above, the second rock may be a main rock or a special mineral rock. In some exemplary embodiments, if a particular depth interval includes a special mineral rock, the percentage of the particular depth interval that is not occupied by the first rock may be considered to be entirely occupied by the special mineral rock. To illustrate, the pair of sonic data thresholds 608 shown in FIG. 6 may be used to determine whether a particular depth interval is at least partially occupied by a special mineral rock. For example, anhydrite may be defined to have sonic transit time in the range of 48-52 μsec/foot, and salt may be defined to have sonic transit time in the range of 67-70 μsec/foot. Using the pair of sonic data thresholds 608, which identify a range of sonic transit time values corresponding to a particular special mineral rock, the sonic log data value for a particular depth interval may be used to determine whether the particular depth interval is at least partially occupied by a special mineral rock. For example, if the sonic transit time for a particular depth interval is 50 μsec/foot, the particular depth interval may be determined as being at least partially occupied by anhydrite.

In some exemplary embodiments, volume percentages of special mineral rocks at some or all of the depth intervals of a wellbore may not be considered to determine the lithology of a relevant portion or all of the rock formation based on the pair of sonic data thresholds 608. For example, if a portion of a rock formation of a wellbore is known not include special mineral rocks, the lithology of the rock formation of the wellbore would depend on the first rock, the main rock, and the third rock but not the special mineral rocks.

In some exemplary embodiments, the percentage of a particular depth interval that is occupied by either the main rock or the third rock is determined only if the particular depth is not occupied by a special mineral rock. For example, if a particular depth interval is determined to be 55% occupied by clay based on equation (1), the remaining 45% of the depth interval is determined as being occupied by a special mineral rock if the depth interval is determined as including the special mineral rock based on the pair of sonic data thresholds 608 as described above. Accordingly, in some exemplary embodiments, the percentage of a particular depth interval that is occupied by either the main rock (as the second rock) or the third rock may be determined using the sonic data threshold 606 if a particular depth interval is not entirely occupied by the first rock and/or if the particular depth interval does not include a special mineral rock as determined using the pair of sonic data thresholds 608.

To illustrate with respect to FIG. 6 and using clay as an example of the first rock and sandstone as an example of the main rock, after the percentage of clay is determined for a particular depth interval, the remaining percentage of the depth interval is allocated to sandstone if the sonic log data value for the particular depth interval is greater than the sonic data threshold 606 or to the third rock if the sonic log data value for the particular depth interval is less than or equal to the sonic data threshold 606. Alternatively, after the percentage of clay is determined for a particular depth interval, the remaining percentage of the depth interval is allocated to sandstone if the sonic log data value for the particular depth interval is greater than or equal to the sonic data threshold 606 or to the third rock if the sonic log data value for the particular depth interval is less than the sonic data threshold 606

As indicated above, the lower gamma ray threshold 602, the upper gamma ray threshold 604, the sonic data threshold 606, and the pair of sonic data thresholds 608 may be set or adjusted such that the lithology of the rock formation of the wellbore correlates well with the general pattern of the mathematically averaged ROP data. For example, if the percentages of the rocks for the depth intervals of the wellbore are such that the lithology of the rock formation for the wellbore (as determined using particular values of the lower gamma ray threshold 602, the upper gamma ray threshold 604, the sonic data threshold 606, and the pair of sonic data thresholds 608) does not correlate well with the general pattern of the mathematically averaged ROP data, one or more of the lower gamma ray threshold 602, the upper gamma ray threshold 604, the sonic data threshold 606, and the pair of sonic data thresholds 608 may be adjusted to obtain a better correlation. As an illustrative example, the lithology of the rock formation of the wellbore may be considered as correlating well with the general pattern of the mathematically averaged ROP data if the sequence of mostly clay depth intervals and mostly sandstone depth intervals of the wellbore reasonably corresponds to the sequence of relatively higher and relatively lower ROP values, respectively, of the mathematically averaged ROP data irrespective of correlations at particular individual depth intervals. As another illustrative example, lack of correlation between the general sequence of relative high and relatively low ROP values of the mathematically averaged ROP data and the general sequence of mostly clay, mostly a special mineral rock (e.g., anhydrite), and mostly third rock (e.g., limestone) may indicate that the lithology of the rock formation for the wellbore does not correlate well with the general pattern of the mathematically averaged ROP data.

In some exemplary embodiments, the lithology of the rock formation at a particular depth interval of the wellbore may be determined to be 100% clay (i.e., clay being an example of the first rock). As another example, the lithology of the rock formation at a particular depth interval may be determined as 70% clay and 30% a special mineral rock (e.g., anhydrite, gypsum, coal, salt, or igneous). As yet another example, the lithology of the rock formation at a particular depth interval may be determined as 0% clay and 100% a special mineral rock. As another example, the lithology of the rock formation at a particular depth interval may be determined as 80% clay and 20% main rock (e.g., sandstone). As yet another example, the lithology of the rock formation at a particular depth interval may be determined to be 30% clay and 70% third rock (e.g., limestone).

After the lithology of the rock formation is determined as described above, the individual per rock type UCS equations and the lithology of the rock formation may be used to determine the UCS of the wellbore by determining the UCS of the rock formation for individual depth intervals of the wellbore. In some exemplary embodiments, the individual per rock type UCS equations used in determining the UCS of the rock formation may be industry standard equations that are generally available for different rock types. Industry standard equations for clay, sandstone, and the third rock along with corresponding curves are illustrated in FIG. 7A. Alternatively, the per rock type UCS equations may be generated, for example, based on results of laboratory analysis of core samples. For example, the per rock type UCS equations may be generated by correlating sonic log data with compressive strength information determined through laboratory analysis of core samples and determining a best fit curve. Examples of generated per rock type UCS equations are illustrated in FIG. 7B. While the equations and curves shown in FIGS. 7A and 7B are exponential, the per rock type UCS equations for some rocks may be non-exponential. For example, the per rock type UCS equations for some of the special mineral rocks may be linear.

The UCS of the rock formation of the wellbore is the aggregate of the UCS of the rock formation of the wellbore at each depth interval of the wellbore. For each depth interval of the wellbore, after the percentage of each rock at the particular depth interval and the UCS of each rock at the particular depth interval are determined as described above, the UCS of the rock formation at each depth interval of the wellbore may be determined using the following equation:

$$UCS = [UCS\_r1 \times [m\ \%]] + [UCS\_r2 \times [n\ \%]] + [UCS\_r3 \times [p\ \%]] \qquad (2)$$

where:
UCS_r1 is the UCS of the first rock;
m is the percentage of the first rock at the particular depth interval;
UCS_r2 is the UCS of the second rock;
n is the percentage of the second rock at the particular depth interval;
UCS_r3 is the UCS of the third rock; and
p is the percentage of the third rock at the particular depth interval.

In some exemplary embodiments, when a particular depth interval includes a special mineral rock (as the second rock) as determined based on the pair of sonic data thresholds 608, the last term ([UCS_r3×[p %]]) of equation (2) is zero. Similarly, when a particular depth interval includes a main rock (as the second rock) as determined based on the sonic data thresholds 606, the last term ([UCS_r3×[p %]]) of equation (2) is also zero. When a particular depth interval includes a third rock (e.g., dolomite) as determined based on the sonic data threshold 606 as described above, the second term ([UCS_r2×[n %]]) of equation (2) is zero.

As indicated above, the per rock UCS (i.e., UCS_r1, UCS_r2, and UCS_r3 in equation (1) above) at a particular depth interval of the wellbore may be determined using per rock type industry standard equations illustrated in FIG. 7A or the generated per rock type UCS equations shown in FIG. 7B, where "y" is the per rock UCS (e.g., UCS_r1) and where "x" is the sonic log data value for the particular depth interval.

Although particular rocks or categories of rocks may be described herein as a first rock, a second rock, a main rock, a special mineral rock, and/or a third rock, in some exemplary embodiments, a particular rock or a particular category of rocks may be considered as any one of the first rock, the second rock, a main rock, a special mineral rock, and the third rock as the terms are used herein without departing from the scope of this disclosure. For example, salt may be considered as a main rock in rock formations of some wellbores and as a special mineral rock in rock formations of other wellbores. As another example, anhydrite may be considered a special mineral rock (i.e., a second rock) in rock formations of some wellbores and as a first rock in rock formations of other wellbores. As yet another example, one type of sandstone may be considered a main rock and another type of sandstone may be considered a third rock in rock formations of a wellbore.

Figure 2:
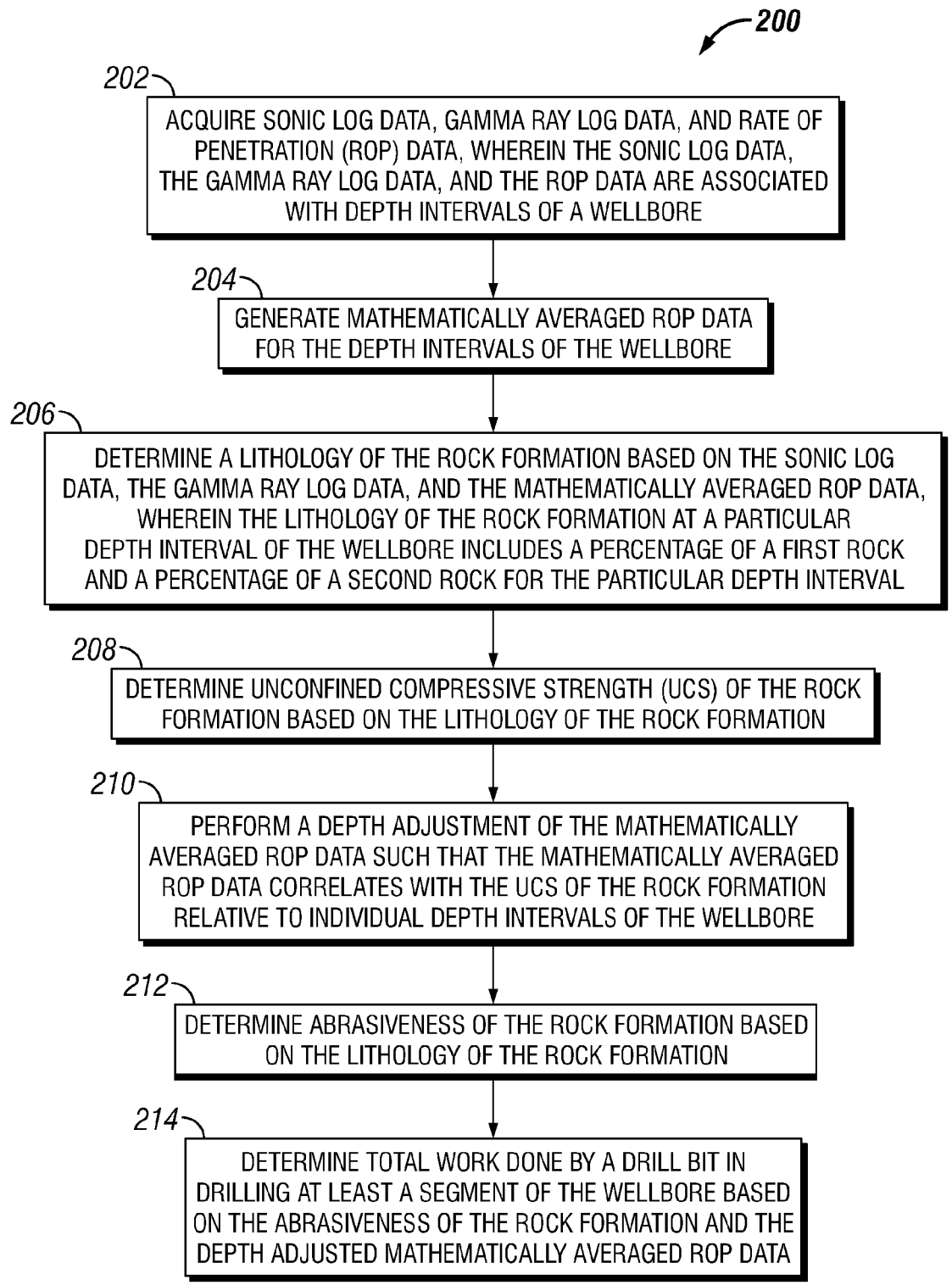
FIG. 2 is a flowchart illustrating a method of analyzing a wellbore drilling operation in accordance with an exemplary embodiment.

FIG. 2 is a flowchart illustrating a method 200 of analyzing a wellbore drilling operation in accordance with another exemplary embodiment. The method 200 includes acquiring sonic log data, gamma ray log data, and ROP data at step 202. The sonic log data, the gamma ray log data, and the ROP data are associated with depth intervals of a wellbore. In some exemplary embodiments, step 202 of the method 200 corresponds to step 102 of the method 100 of FIG. 1 and is performed in the same or similar manner described with respect to step 102.

The method 200 further includes generating mathematically averaged ROP data for the depth intervals of the wellbore at step 204. For a particular depth interval, the mathematically averaged ROP data is generated based on a first time period spent drilling a first depth interval and a second time period spent drilling a second depth interval. The first depth interval may be adjacently above a wellbore depth bordering the second depth interval that is below the wellbore depth. For example, the mathematically averaged ROP data determined based on the first depth interval and the second depth interval may be associated with the first depth interval that is adjacently above the particular wellbore depth.

The first time period and the second time period are determined based on the corresponding instantaneous ROP values acquired in step 202 (in units of distance per time) for the respective depth intervals. For example, if each of the first and second depth intervals is 1 meter and if the ROP value for the first depth interval is 100 meters per hour, the time spent drilling the first depth interval is ((1 meter)/(100 meters/hour), which equals 0.01 hour. Similarly, if the ROP value for the second depth interval is 10 meters per hour, the time spent drilling the second depth interval is ((1 meter)/(10 meters/hour), which equals 0.1 hour. Accordingly, the mathematically averaged ROP value at the wellbore depth bordering the two depth intervals is ((1 meter+1 meter)/(0.1 hour+0.01 hour), which equals approximately 18 meters/hour.

In some exemplary embodiments, the mathematically averaged ROP data for a particular depth interval may be generated based on time periods spent drilling several sequential depth intervals that are adjacently above and several number of sequential depth intervals that are adjacently below a particular wellbore depth that borders the particular depth interval. For example, the total number of sequential depth intervals that are above and below a wellbore depth that borders a particular depth interval may be forty.

To illustrate, the curve 504 in FIG. 5 represents mathematically averaged ROP data generated based on twenty sequential depth intervals that are above and twenty sequential depth intervals that are below wellbore depths bordering corresponding depth intervals. The time spent drilling each of the depth intervals is determined in a similar manner described above. As can be clearly seen in FIG. 5, the curve 504 is much smoother than the curve 502, which represents instantaneous ROP data acquired in step 202 above. In comparison, the curve 506, which smoother than the curve 504, is a mathematically averaged ROP data curve that is generated based on 140 sequential depth intervals, where seventy of the depth intervals are above and the other seventy are below wellbore depths bordering corresponding depth intervals for which the mathematically averaged ROP data is determined. The particular number of depth intervals that should be used in generating the mathematically averaged ROP data may depend on a number of factors including reliability of the instantaneous ROP data.

At step 206, the method 200 includes determining a lithology of the rock formation based on the sonic log data, gamma ray log data, and the mathematically averaged ROP data. The lithology of the rock formation at a particular depth interval of the wellbore includes a percentage of a first rock (e.g., clay) and a percentage of a second rock (e.g., sandstone), for example, by volume of the particular depth interval. The lithology of the rock formation for the wellbore is determined in the same manner described with respect to the step 104 of the method 100 of FIG. 1. For example, the lower gamma ray threshold 602, the upper gamma ray threshold 604, the sonic data threshold 606, and the pair of sonic data thresholds 608 along with the sonic log data and the gamma ray log data acquired in step 202 of the method 200 may be used to determine the percentage of first rock (e.g., clay), sandstone, and a third rock (stringers) in the same manner described with respect to the step 104 of the method 100 of FIG. 1. As also described with respect to step 104 of the method 100, the lower gamma ray threshold 602, the upper gamma ray threshold 604, and the sonic data threshold 606 illustrated in FIG. 6 may be set or adjusted based on the mathematically average ROP data determined at step 202 such that the lithology of the rock formation correlates well with the general pattern of the mathematically average ROP data as described with respect to step 104 of the method 100 of FIG. 1.

At step 208, the method 200 includes determining UCS of the rock formation based on the lithology of the rock formation. The UCS of the rock formation at the depth intervals of the wellbore is determined as described with respect to step 104 of the method 100 of FIG. 1. For example, for each depth interval of the wellbore, the UCS of the rock formation is determined based on the lithology of the rock formation at the particular depth interval and based on individual per rock type UCS equations corresponding to each rock type at the particular depth interval.

Figure 8:
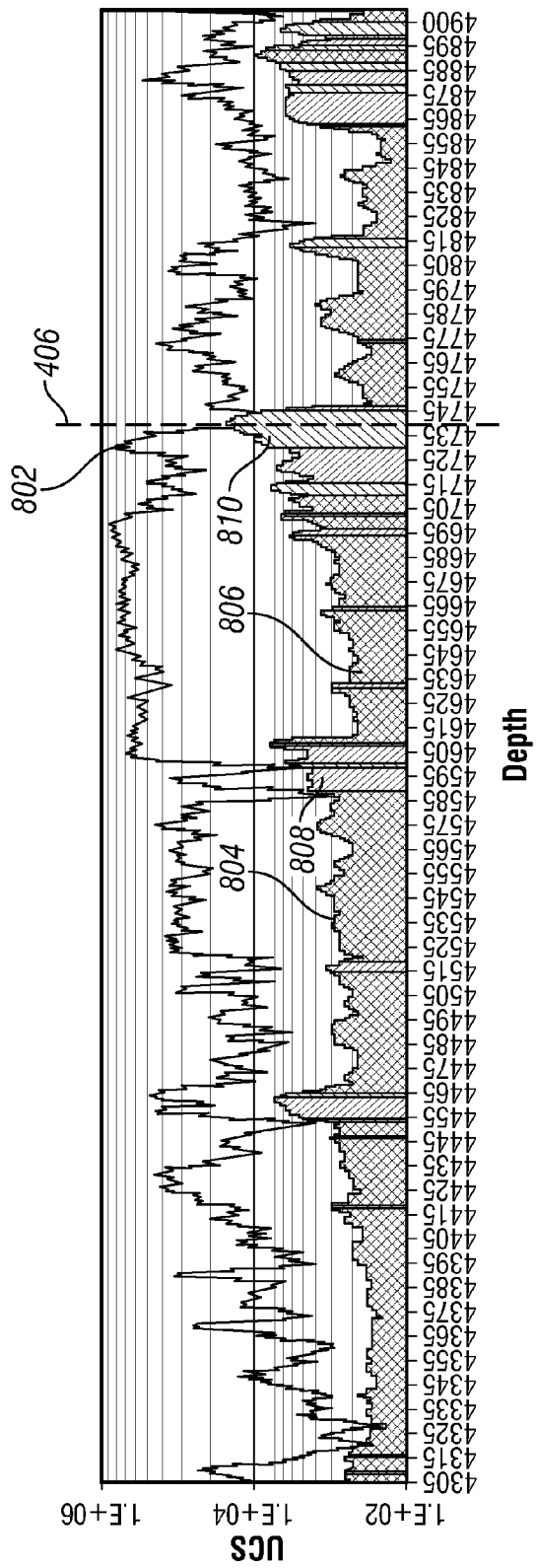
FIG. 8 is an example graph illustrating mathematically averaged ROP data, lithology of a rock formation, and the UCS of the rock formation associated with depth intervals of a wellbore.

At step 210, the method 200 includes performing a depth adjustment of the mathematically averaged ROP data such that the mathematically averaged ROP data correlates with the UCS of the rock formation relative to individual depth intervals of the wellbore. To illustrate with reference to FIG. 8, the mathematically averaged ROP data curve 802 and the UCS curve 804 are shown. The UCS curve 804 is shown as the envelope of the lithology plot, which includes clay sections 806 (as an example of the rock formation of the wellbore that is occupied by the first rock), sandstone sections 808 (as an example of the rock formation of the wellbore that is occupied by the second rock), and third rock sections 810 (as an example of the rock formation of the wellbore that is occupied by the third rock (e.g., dolomite)). With respect to the lithology of the rock formation of the wellbore, only the dominant rock is shown in FIG. 8 with respect to any particular depth interval. The dotted line 406 represents a depth at which a particular drill bit used to drill the wellbore became totally worn out.

Figure 9:
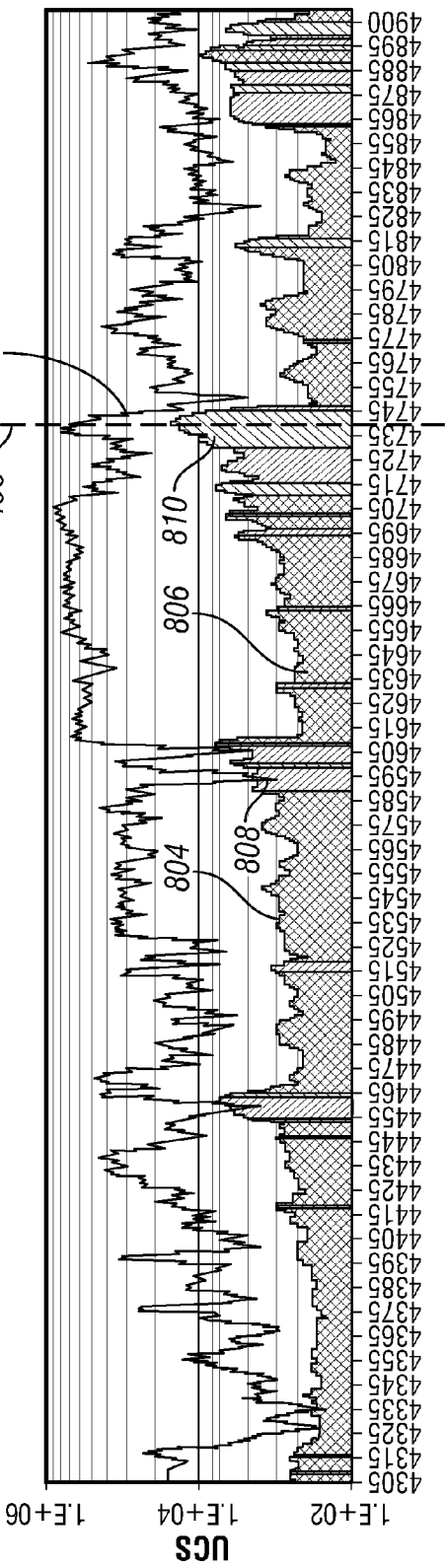
FIG. 9 is an example graph illustrating mathematically averaged ROP data, lithology of a rock formation, and the UCS of the rock formation after depth adjustment of mathematically averaged ROP data for correlation with the UCS of the rock formation.

As shown in FIG. 8, although the mathematically averaged ROP data curve 802 correlates well with the lithology of the rock formation, the mathematically averaged ROP data curve 802 is misaligned with respect to the UCS curve 804. For example, FIG. 8 shows the ROP increasing close to the dotted line 406 where the increase in ROP overlaps with the third rock, which is harder than sandstone. Accordingly, depth adjustment of the mathematically averaged ROP data may be performed to closely align the mathematically averaged ROP data with the UCS of the rock formation as illustrated in FIG. 9, where the curve 902 corresponds to the depth adjusted mathematically averaged ROP data. In contrast to the curve 802 shown in FIG. 8, the curve 902 is substantially aligned with the UCS curve 804. Depth adjustment of the mathematically averaged ROP data for better correlation with the UCS of the rock formation may be needed due to reasons such as differences in measurement tool calibration and reference depth levels used in collecting well log data and instantaneous ROP data.

At step 212, the method 200 includes determining abrasiveness of the rock formation based on the lithology of the rock formation. Because abrasiveness of a rock formation affects the longevity of drilling bits (bit cutters, particular), abrasiveness information acquired from a drilled wellbore may be highly valuable in optimizing subsequent drilling operations. For example, the abrasiveness of the rock formation at particular depth intervals may be used to determine to total work done by a bit in drilling at least a segment of a wellbore. In turn, the total work done by a drill bit may enable, for example, improved pull-out-of-hole (POOH) timing.

Abrasiveness of the rock formation at a particular depth interval may be computed using the following equation:

$$ABR_d = [UCS_d \times G_1 \times [m\ \%]] + [UCSd \times G_2 \times [n\ \%]] + [UCSd \times G_3 \times [p\ \%]] \quad (3)$$

where:

UCSd is the UCS of the rock formation at a particular depth interval d as determined in step 208;

G1 is grinding factor for the first rock (e.g., clay);

m is the percentage of the first rock at the particular depth interval d;

G2 is grinding factor for the second rock (e.g., special mineral rock such as anhydrite or a main rock such as sandstone);

n is the percentage of the second rock (special mineral rock or main rock) at the particular depth interval d;

G3 is grinding factor for the third rock (e.g., a mixture of limestone, dolomite, etc.); and p is the percentage of the third rock at the particular depth interval d.

Similar to equation (2), in some exemplary embodiments, when a particular depth interval includes a special mineral rock or a main rock, the last term ($[UCS_d \times G_3 \times [p\ \%]]$) of equation (3) is zero. When a particular depth interval includes a third rock (e.g., dolomite) as determined based on the sonic data threshold 606 as described above, the second term ($[UCS_d \times G_2 \times [n\ \%]]$) of equation (3) is zero.

In some example embodiments, the grinding factor for each of the rock may be set in reference to one rock. For example, the grinding factor for each of the rock may be set in reference to sandstone, which for example may have a grinding factor of 1. Accordingly, the grinding factor of, for example, clay may be set to 0.1 while the grinding factor of the third rock may be set based on the particular rocks that make up the third rock. To illustrate with reference to FIGS. 10 and 11, the solid curve 1006 in corresponds to the computed abrasiveness of the rock formation relative to depth intervals of the wellbore.

At step 214, the method 200 includes determining total work done by a drill bit in drilling at least a segment of the wellbore based on the abrasiveness of the rock formation determined in step 212 and the depth adjusted mathematically averaged ROP data from step 210. For each depth interval of the wellbore, the work done by the bit in drilling a particular depth interval is determined by the following equation:

$$WD_d = ABR_d \times T_d \quad (4)$$

where:

$WD_d$ is the work done by a drill bit in drilling a particular depth interval d;

$ABR_d$ is the abrasiveness of the rock formation for the particular depth interval d as determined from equation (3); and $T_d$ is the time spent drilling the particular depth interval d.

The time spent drilling a particular depth interval d may be determined in a manner described with respect to step 204 in generating the mathematically averaged ROP data. The total work done by a drilling bit may be determined by summing up the word done at each depth interval of the wellbore ($WD_d$) that is drilled by the drill bit.

Figure 3:
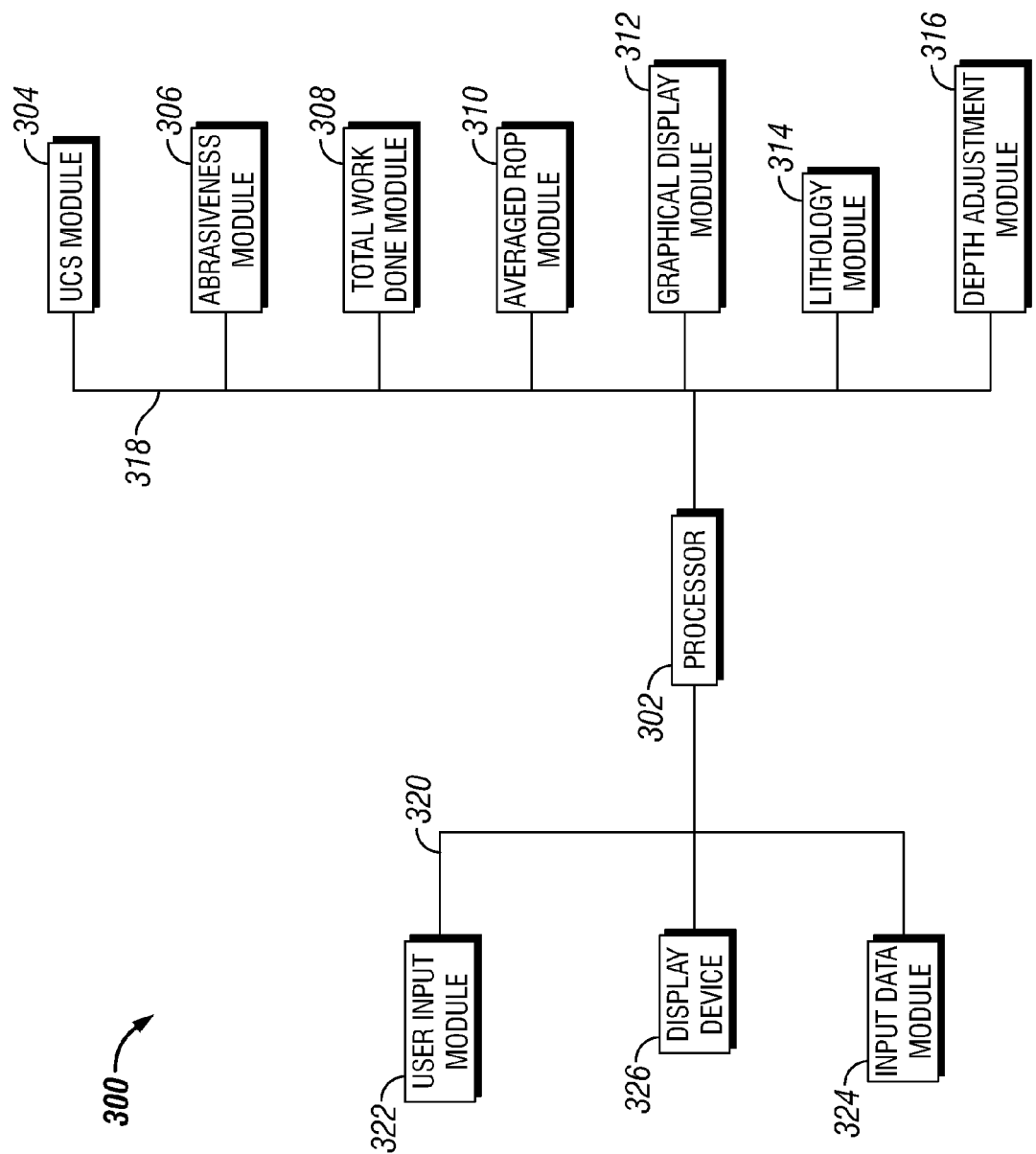
FIG. 3 is a computer system for analyzing a wellbore drilling operation and graphically displaying wellbore drilling operation information in accordance with an exemplary embodiment.

FIG. 3 is a computer system 300 for analyzing a wellbore drilling operation and graphically displaying wellbore drilling operation information in accordance with an exemplary embodiment. In some exemplary embodiments, the computer system 300 may be used to implement the method 100 of FIG. 1 and the method 200 of FIG. 2. As illustrate in FIG. 3, the system 300 includes a processor 302 that controls operations of the computer system 300. The processor 302 may interact with the modules and the display device of the computer system 300 via signal routes 318 and 320.

The processor 302 may be a single processor or multiple processors that are located within a single device (e.g., a laptop computer) or within multiple devices. For example, the processor 302 may be one or more processors (e.g., Intel® or ARM® microprocessors) and may include software code stored in a memory device, such as an SRAM. The processor 302 may also be fully or partially implemented in hardware, such as one or more field programmable gate arrays (FPGAs) or one or more application specific semiconductor devices (ASICs).

In some exemplary embodiments, the computer system 300 includes an input data module 324 for acquiring sonic log data, gamma ray log data, and ROP data. The sonic log data, the gamma ray log data, and the ROP data may be associated with depth intervals of a wellbore. The computer system 300 further includes a UCS module 304 for determining UCS of a rock formation associated with the wellbore using well log data and drilling data. The well log data is limited to the sonic log data and the gamma ray log data, and the drilling data is limited to the ROP data.

In some exemplary embodiments, the computer system 300 includes an averaged ROP module for generating mathematically averaged ROP data based on the ROP data. The computer system 300 may generate the mathematically averaged ROP data in the same or substantially similar manner described with respect to the method 200 of FIG. 2. The computer system 300 further includes a lithology module 314 for determining a lithology of the rock formation in the same or substantially similar manner described with respect to the method 100 of FIG. 1.

In some exemplary embodiments, the computer system 300 includes a depth adjustment module 316 for performing a depth adjustment of the mathematically averaged ROP data such that the mathematically averaged ROP data correlates with the UCS of the rock formation with respect to individual depth intervals of the wellbore. To illustrate, the computer system 300 may perform the depth adjustment in the same or substantially similar manner described with respect to the method 200 of FIG. 2.

In some exemplary embodiments, the computer system 300 may include an abrasiveness module 306 for determining abrasiveness of the rock formation based on the lithology of the rock formation in the same or substantially similar manner described with respect to the method 200 of FIG. 2. Further, the computer system 300 may include a total-work-done module for determining total work done by a drill bit in drilling at least a segment of the wellbore based on the abrasiveness of the rock formation and the mathematically averaged ROP data in the same or substantially similar manner described with respect to the method 200 of FIG. 2.

In some exemplary embodiments, the computer system 300 may also include a under input module 322 for receiving input information from a user. For example, a user may provide parameters such as sonic and gamma ray threshold values illustrated in FIG. 6.

Figure 12:
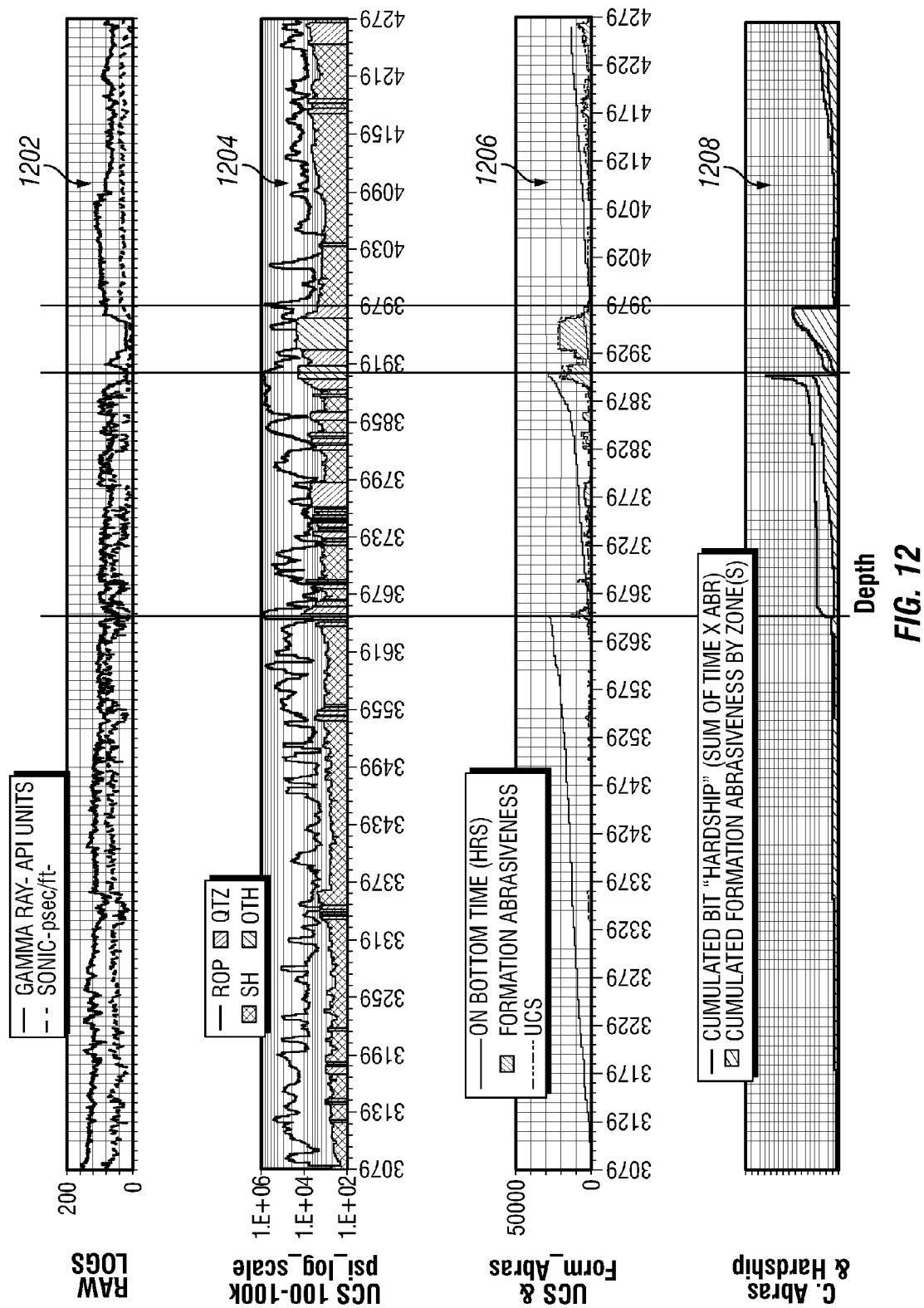
FIG. 12 illustrates a graphical display of data used and generated by the methods and system of analyzing wellbore drilling operation of FIGS. 1-3 in accordance with an exemplary embodiment.

The computer system 300 also includes a display device 326 for displaying graphical representations of data. To illustrate, the processor 302 can generate graphical representations of the sonic log data, the gamma ray log data, the ROP data, a lithology of a rock formation, and the UCS of the rock formation for display on the display device 326. The computer system 300 may display the graphical representations on the display device 326, for example, as illustrated in FIG. 12. To illustrate, the sonic log data, the gamma ray log data, the ROP data, the lithology of the rock formation, and the UCS of the rock formation may be displayed on the display device 326 with respect to depths that border with the depth intervals of the wellbore.

In some exemplary embodiments, the processor 302 can update the graphical representation of the lithology of the rock formation in response to a user input that is provided via the user input module 322. The updated graphical representation of the lithology of the rock can be displayed on the display device 326. For example, the user input provided via the user input module 322 may be a gamma ray threshold that is used in determining a percentage of clay at individual depth intervals of the wellbore.

In some exemplary embodiments, the computer system 300 can generate and display an updated graphical representation of the ROP data. For example, the ROP data may be the mathematically averaged ROP data generated by the processor 302 based on instantaneous ROP data. Relative to the originally displayed graphical representation of the ROP data, the updated graphical representation of the ROP data may be shifted with respect to the depth intervals of the wellbore such that the ROP data correlates with the UCS of the rock formation with respect to individual depth intervals of the wellbore.

In some exemplary embodiments, the processor 302 may generate a graphical representation of the abrasiveness of the rock formation. The graphical representation of the abrasiveness of the rock formation may be displayed by the computer system 300 on the display device 326. Similarly, a graphical representation of the total work done by a drill bit in drilling, for example, at least a segment of the wellbore may be generated by the processor 302 and displayed on the display device 326.

Although a particular topography of modules is illustrated in FIG. 3, in alternative embodiments, the computer system 300 may have other topologies. Further, one or more of the modules 604-616 of the computer system 600 may be a software module, a hardware module, or a combination thereof. For example, one or more of the modules 604-616 module may include a software code stored in a memory device such as a static random access memory (SRAM).

As described earlier, FIG. 4 is an example graph illustrating wellbore sonic log data and gamma ray log data associated with depth intervals of a wellbore. The sonic log data is represented by the curve 402 and the gamma ray log data is represented by the curve 404. As illustrated in FIG. 4, the sonic log data and the gamma ray log data are shown relative to depths that border depth intervals of the wellbore. For example, the interval between two consecutive depth values shown in FIG. 4 may represent a depth interval.

FIG. 5 illustrates example graphs of instantaneous ROP data and mathematically averaged ROP data associated with depth intervals of a wellbore. The curve 502 represents instantaneous ROP data acquired via a measurement tool. Individual instantaneous ROP values may not be reliable desired due to, for example, errors introduced during measurement. Accordingly, mathematically averaged ROP data that is generated based on multiple instantaneous ROP values may be more reliable. The curves 504 and 506 represent mathematically averaged ROP data generated as described above with respect to step 204 of the method 200. As described above, the curve 504 is generated based on forty sequential depth intervals, and the curve 506 is generated based on one hundred forty sequential depth intervals. As can be clearly seen in FIG. 5, the curves 504 and 506 are smoother than the curve 502. The number of depth intervals used in generating mathematically averaged ROP data may depend on a number of factors including the reliability of the instantaneous ROP.

FIG. 6 is an example graph illustrating a cross-plot of wellbore sonic log data and gamma ray log data used in determining a lithology of a rock formation in accordance with an exemplary embodiment. As described with respect to step 104 of the method 100, the cross-plot illustrated in FIG. 6 is used to determine the lithology of the rock formation of the wellbore. The pair of sonic data thresholds 608 are shown as illustrative examples and the cross-plot may include multiple pairs of sonic data thresholds corresponding to different special mineral rocks.

FIGS. 7A and 7B are graphs illustrating plots of equations used in determining UCS of individual rock components in accordance with an exemplary embodiment. FIG. 7A illustrates the per rock type industry standard equations and plots for clay (plot 702), sandstone (plot 704), and a third rock (plot 706). As described above, the third rock may be a combination of rocks such as limestone and dolomite. FIG. 7B illustrates example derived per rock type equations and plots for clay (plot 708), sandstone (plot 710), and a third rock (plot 712). The individual per rock type UCS equations may be industry standard equations that are generally available for different rock types or may be per rock type UCS equations that are derived from the industry standard equations as described with respect to the method 100. As described above with respect to step 104 of the method 100, individual per rock type UCS equations are used to determine per rock UCS at individual depth intervals of the wellbore. The per rock UCS information is used to determine the overall UCS of the rock formation at individual depth intervals of the wellbore based on equation (2). As described above, although FIGS. 7A and 7B illustrate exponential equations, the per rock type UCS equations for some rocks may be non-exponential. For example, some of the special mineral rocks may have linear per rock type UCS equations.

FIG. 8 is an example graph illustrating mathematically averaged ROP data, the lithology of the rock formation, and the UCS of the rock formation associated with depth intervals of the wellbore as described with respect to step 210 of the method 200. The clay sections 806, the sandstone sections 808, and the third rock sections 810 are illustrative examples of sections of the rock formation of a wellbore that are dominantly occupied by clay (example of the first rock), sandstone (example of a main rock), and third rock (e.g., limestone), respectively. In addition or alternatively, the lithology of the rock formation illustrated on FIG. 8 may include sections of the rock formation that are dominantly occupied by a special mineral rock (e.g. anhydrite, gypsum, coal, salt, and/or igneous) and a main rock other than sandstone. Further, in addition or instead of the clay sections 806, the lithology of the rock formation may include sections that are dominantly occupied by a first rock section other than clay.

FIG. 9 is an example graph illustrating mathematically averaged ROP data, lithology of a rock formation, and the UCS of the rock formation after depth adjustment of mathematically averaged ROP data for improved correlation with the UCS of the rock formation. The curve 902 corresponds to the depth adjusted mathematically averaged ROP data. In contrast to the curve 802 shown in FIG. 8, the curve 902 is substantially aligned with the UCS curve 804.

FIG. 10 illustrates example graphs of formation abrasiveness and total work done by a drill bit based on the mathematically averaged ROP data prior to depth adjustment in accordance with an exemplary embodiment. FIG. 11 illustrates example graphs of formation abrasiveness and total work done by the drill bit based on the mathematically averaged ROP data after depth adjustment of the mathematically averaged ROP data in accordance with an exemplary embodiment. Referring to FIG. 10, the graph 1002 illustrates the on-bottom time 1004 per zone (e.g., depth drilled by a particular bit). The solid curve 1006 corresponds to the computed abrasiveness of the rock formation as described above with respect to step 212 of the method 200. The curve 1008 corresponds to the UCS of the rock formation relative to depth intervals of the wellbore. The graph 1010 illustrates the total work done 1012 by a drill bit and the cumulative abrasiveness of the rock formation per zone. The total work done 1012 is determined as described above with respect to step 214 of the method 200. The cumulative abrasiveness of the rock formation is a sum of the individual per depth interval abrasiveness of the depth intervals of the wellbore. As illustrated in FIG. 10, because the on-bottom time 1004, the total bit work done 1012, and the cumulative abrasiveness 1014 based on mathematically averaged ROP data that is not depth adjusted to correlate with the UCS of the rock formation, the on-bottom time 1004, the total bit work done 1012, and the cumulative abrasiveness 1014 are not aligned with the dotted line 406 which corresponds to the depth at which the drill bit "died."

In contrast, the on-bottom time 1104, the total bit work done 1112, and the cumulative abrasiveness 1114 shown in the graphs 1102 or 1110 of FIG. 11 are determined or generated based on the depth adjusted mathematically averaged ROP data. Accordingly, the on-bottom time 1104, the total bit work done 1112, and the cumulative abrasiveness 1114 shown in FIG. 11 are closely aligned with the dotted line 406.

FIG. 12 illustrates a graphical display of data used and generated by the methods and system of analyzing wellbore drilling operation described with respect to FIGS. 1-3 in accordance with an exemplary embodiment. As described with respect to FIG. 3, graphical representations of data may be displayed on a display device (e.g., the display device of FIG. 3). In FIG. 12, the graph 1202 shows graphical representations of sonic log data and gamma ray log data, for example, acquired in step 102 of the method 100 of FIG. 1.

The graph 1204 shows graphical representations of the depth adjusted mathematically averaged ROP data, the UCS of the rock formation, and the lithology of the rock formation. For example, with respect to the lithology of the rock formation, only the rock type that is the most abundant (for example, by volume) at a particular depth interval of the wellbore is shown with respect to the corresponding bordering depths. The graph 1206 shows graphical representations of formation abrasiveness, UCS, and on-bottom time. The graph 1208 shows graphical representations of cumulated formation abrasiveness and total work done by a drill bit (referred to as Cumulated bit hardship).

In the graphs 1202, 1204, 1206, 1208, the graphical representations of data are shown with respect to depths of the wellbore, where the depth borders depth intervals of the wellbore. Further, the graphs 1202, 1204, 1206, 1208 may be displayed on a single display device.

The UCS of the rock formation of a wellbore, abrasiveness of the rock formation, on-bottom time, and total work done by the drill bit can be used to optimize drilling programs for subsequent drilling operations with reasonable reliability. Further, because the information (i.e., UCS of the rock formation, the abrasiveness of the rock formation, the on-bottom time, and the total work done by the drill bit) is acquired with commonly available well log data and drilling data, optimization of drilling operation be performed often.

Although each exemplary embodiment has been described in detailed, it is to be construed that any features and modifications that is applicable to one embodiment is also applicable to the other embodiments.

Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A method for analyzing a wellbore drilling operation, the method comprising:
   acquiring sonic log data, gamma ray log data, and rate of penetration (ROP) data, wherein the sonic log data, the gamma ray log data, and the ROP data are associated with depth intervals of a wellbore;
   generating mathematically averaged ROP data for the depth intervals of the wellbore;
   determining a lithology of a rock formation:
      using well log data limited to the sonic log data and the gamma ray log data and drilling data limited to the ROP data,
      based on the sonic log data, the gamma ray log data, an upper gamma ray threshold, a lower gamma ray threshold, and one or more sonic data thresholds, and
      by adjusting one or more of the upper gamma ray threshold, the lower gamma ray threshold, or the one or more sonic data thresholds such that the lithology of the rock formation correlates with the mathematically averaged ROP data;
   determining unconfined compressive strength (UCS) of the rock formation associated with the wellbore using the determined lithology;
   selecting drilling parameters for drilling a second wellbore using the determined UCS, wherein the drilling parameters include weight-on-bit and bit rotational speed; and
   drilling the second wellbore using the selected drilling parameters.

2. The method of claim 1, wherein generating the mathematically averaged ROP data for the depth intervals of the wellbore comprises generating a mathematically averaged ROP value corresponding to a particular depth interval of the wellbore based a first time period spent drilling a first depth interval and a second time period spent drilling a second depth interval, wherein the first depth interval is adjacently above the particular depth interval, and wherein the second depth interval is adjacently below the particular depth interval.

3. The method of claim 1, wherein determining the lithology of the rock formation comprises determining a percentage of a particular depth interval of the wellbore occupied by a first rock and determining a percentage of the particular depth interval of the wellbore occupied by a second rock.

4. The method of claim 3, wherein the first rock is clay and wherein the percentage of the first rock is determined based on the upper gamma ray threshold, the lower gamma ray threshold, and information from a mud log.

5. The method of claim 4, wherein the percentage of the first rock at the particular depth interval is determined to be 100% if a gamma ray log data value corresponding to the particular depth interval exceeds the upper gamma ray threshold and wherein the percentage of the first rock is determined to be 0% if the gamma ray log data value is less than the lower gamma ray threshold.

6. The method of claim 3, wherein, for the particular depth interval, the UCS of the rock formation is determined based on the percentage of the first rock at the particular depth interval and the percentage of the second rock at the particular depth interval.

7. The method of claim 6, further comprising performing a depth adjustment of mathematically averaged ROP data such that the mathematically averaged ROP data correlates with the UCS of the rock formation with respect to individual depth intervals of the wellbore.

8. The method of claim 7, further comprising determining abrasiveness of the rock formation based on the lithology of the rock formation and grinding factors of the first rock and the second rock.

9. The method of claim 8, wherein determining the abrasiveness of the rock formation comprises determining abrasiveness of the rock formation at a particular depth interval based on the percentage of the first rock at the particular depth interval and the percentage of the second rock at the particular depth interval.

10. The method of claim 8, further comprising determining total work done by a drill bit in drilling at least a segment of the wellbore based on the abrasiveness of the rock formation and the mathematically averaged ROP data.

11. The method of claim 10, wherein determining the total work done by the drill bit comprises determining time spent drilling the particular depth interval by the drill bit based on a mathematically averaged ROP data value of the mathematically averaged ROP data, wherein the mathematically averaged ROP data value corresponds to the particular depth interval.

12. The method of claim 3, wherein the one or more sonic data thresholds include a pair of sonic data thresholds defining a range of sonic transit time values, wherein a special mineral rock is determined as occupying a portion of a particular depth interval of the wellbore if the sonic transmit time for the particular depth interval is within the range.

13. The method of claim 12, wherein the special mineral rock is one of anhydrite, gypsum, coal, salt, or igneous.

* * * * *